US012668106B2

(12) United States Patent
Choi

(10) Patent No.: US 12,668,106 B2
(45) Date of Patent: Jun. 30, 2026

(54) RIGIDITY-IMPROVED VEHICLE PANEL DOOR

(71) Applicants: Hyundai Motor Company, Seoul (KR); Kia Corporation, Seoul (KR)

(72) Inventor: Je-Won Choi, Anyang-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 367 days.

(21) Appl. No.: 18/222,947

(22) Filed: Jul. 17, 2023

(65) Prior Publication Data

US 2024/0100920 A1 Mar. 28, 2024

(30) Foreign Application Priority Data

Sep. 27, 2022 (KR) ........................ 10-2022-0122783

(51) Int. Cl.
*B60J 5/04* (2006.01)
(52) U.S. Cl.
CPC ........... *B60J 5/0447* (2013.01); *B60J 5/0426* (2013.01); *B60J 5/0431* (2013.01); *B60J 5/0433* (2013.01); *B60J 5/0437* (2013.01)
(58) Field of Classification Search
CPC ...... B60J 5/0426; B60J 5/0431; B60J 5/0433; B60J 5/0437; B60J 5/0447; B60J 5/02
See application file for complete search history.

(56) References Cited

U.S. PATENT DOCUMENTS

| | | | | |
|---|---|---|---|---|
| 2007/0222256 A1* | 9/2007 | Valentage | .............. | B60J 5/0448 296/146.7 |
| 2009/0224571 A1* | 9/2009 | Huttsell | ................. | B60J 5/0452 296/187.05 |
| 2010/0148535 A1* | 6/2010 | Takahashi | .............. | B60J 5/0429 296/187.12 |
| 2023/0264544 A1* | 8/2023 | Plourde, Jr. | ............ | B60J 5/0434 296/146.6 |

FOREIGN PATENT DOCUMENTS

| | | | | | |
|---|---|---|---|---|---|
| DE | 19936175 A1 | * | 2/2001 | ............ | B60J 5/0483 |
| JP | 3701611 B2 | * | 10/2005 | ............ | B60J 5/0431 |
| JP | 2008239107 A | * | 10/2008 | | |

(Continued)

OTHER PUBLICATIONS

Mehn et al., German Patent No. DE 19936175 A1, English translation dated 2025. (Year: 2001).*

(Continued)

*Primary Examiner* — Caroline N Butcher
(74) *Attorney, Agent, or Firm* — MORGAN, LEWIS & BOCKIUS LLP

(57) ABSTRACT

A vehicle panel door includes an external panel positioned, toward the outside of a vehicle, in a door of the vehicle, an internal panel, an external edge portion of the internal panel being joined to the external panel and the internal panel being positioned, toward the interior of the vehicle, in the door of the vehicle, support members disposed in a longitudinal direction of the vehicle, reinforcement members coupled to a front end portion and a front end portion, (Continued)

respectively, of the door, joint members superposed and coupled to the reinforcement members, respectively and coupled to the support members to surround external surfaces of the support members.

19 Claims, 11 Drawing Sheets

(56) References Cited

FOREIGN PATENT DOCUMENTS

| KR | 20180120339 | A | * | 11/2018 | ............ | B60J 5/0437 |
|----|-------------|---|---|---------|-------------|-------------|
| KR | 10-2019-0040745 | A | | 4/2019 | | |

OTHER PUBLICATIONS

Tsutsumi et al., Japanese Patent No. JP 2008239107. English translation dated 2025. (Year: 2008).*
Kenichi et al., Japanese Patent No. 3701611, English translation dated 2025. (Year: 2005).*
Lee et al., Korean Patent No. 20180120339, English translation dated 2025. (Year: 2018).*

\* cited by examiner

SECTION B – B

SECTION C – C

RIGIDITY-IMPROVED VEHICLE PANEL DOOR

CROSS-REFERENCE TO RELATED APPLICATION

The present application claims priority to Korean Patent Application No. 10-2022-0122783, filed on Sep. 27, 2022, the entire contents of which is incorporated herein for all purposes by this reference.

BACKGROUND OF THE PRESENT DISCLOSURE

Field of the Present Disclosure

The present disclosure relates to a door of a vehicle in which a plurality of panels is connected to each other, and more particularly, to a rigidity-improved vehicle panel door in which a support member in a longitudinal direction and a support member in a height direction that are provided between an external panel and an internal panel are joined to each other in a superposed manner.

Description of Related Art

Typically, as shown in FIG. 1, a door 110 through which an occupant gets in or out of a vehicle 100 is provided on the lateral side of the vehicle 100.

The door 110 is made by joining an external panel 111 and an internal panel 112 to each other. The rigidity of the door 110 is improved by including support members, such as an out belt rail 121, an impact member 122, a hinge reinforcer 124, a latch reinforcer 125, and a quadrant reinforcer 127, within the external panel 111 and the internal panel 112.

Typically, the external panel 111 and the internal panel 112 are made by performing a machining operation on a metal plate using a press mold, and the door 110 is made by joining external edge portions of the external panel 111 and the internal panel 112 to each other by performing a hemming process.

However, the external panel 111 and the internal panel 112 are formed through a large-sized press, which is suitable for a mass production, but not for a small-quantity batch production to develop types of vehicles, such as a purpose-built vehicle (PBV), that needs much time and costs to produce in a small quantity and in various types.

It takes much time and costs to manufacture the press mold, and for return on investment, the same type of vehicles has to be produced in large quantity. It takes much time and costs to manufacture a press mold for each and every type of vehicles to be produced in a small quantity and in various types, which in turn causes an increase in manufacturing cost. Furthermore, when a small change in design, such as a change in a length of the door, occurs, a new press mold has to be developed.

To solve the present problem, a panel for the door may be formed of plastic material which is easy to manufacture, and the door may be manufactured by use of the present panel. However, there occurs a problem in that the door does not have sufficient rigidity.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a rigidity-improved vehicle panel door in which support members in a longitudinal direction and a support member in a height direction are joined to each other in a superposed manner inside a panel for a door.

To accomplish the above-mentioned object, according to an aspect of the present disclosure, there is provided a rigidity-improved vehicle panel door including: an external panel positioned in a door of the vehicle toward an outside of the vehicle, an internal panel positioned in the door of the vehicle toward an interior of the vehicle, wherein an external edge portion of the internal panel is joined to the external panel; support members disposed in a longitudinal direction of the vehicle; reinforcement members coupled to a front end portion and a rear end portion of the door, respectively; and joint members superposed and coupled to the reinforcement members, respectively and coupled to the support members to surround external surfaces of the support members.

In the rigidity-improved vehicle panel door, the joint members include a flange portion which is joined to the reinforcement members and an accommodation portion inside which an end portion of the support members is accommodated.

In the rigidity-improved vehicle panel door, the end portion of the support members may be accommodated by a predetermined depth into the accommodation portion, and the support members may be brought into surface-contact with the accommodation portion inside the accommodation portion.

In the rigidity-improved vehicle panel door, the support members may be a stabilizer and an impact beam that are disposed in a height direction of the vehicle on the door to be spaced apart from each other.

In the rigidity-improved vehicle panel door, the reinforcement members may be a hinge upper reinforcer to which an upper hinge connecting the door to a body of the vehicle is fastened and to which a front end portion of the stabilizer is coupled, and the joint members may be an upper hinge joint surrounding the front end portion of the stabilizer.

In the rigidity-improved vehicle panel door, the reinforcement members may be a hinge reinforcer which is positioned on a lower portion of the hinge upper reinforcer, to which a lower hinge that hinge-connects the door to the body of the vehicle is fastened under the upper hinge, and to which a front end portion of the impact beam is coupled, and the joint members may be a lower hinge joint surrounding the front end portion of the impact beam.

In the rigidity-improved vehicle panel door, the reinforcement members may be a latch reinforcer on which a latch is provided in a rear end portion of the door and to which a rear end portion of the stabilizer is coupled, and the joint members may be a latch upper joint surrounding the rear end portion of the stabilizer.

In the rigidity-improved vehicle panel door, the reinforcement members may be a latch lower reinforcer to which a rear end portion of the impact beam is coupled under the latch reinforcer, and the joint members may be a latch lower joint surrounding the rear end portion of the impact beam.

In the rigidity-improved vehicle panel door, an external edge portion of the joint members may be joined to the reinforcement members.

In the rigidity-improved vehicle panel door, an external edge portion of the reinforcement members may be joined to the internal panel or the external panel.

In the rigidity-improved vehicle panel door, the joint members and the support members may be joined to each other using an adhesive.

In the rigidity-improved vehicle panel door, the joint members and the support members may be joined to each other by $CO_2$ welding.

The rigidity-improved vehicle panel door may further include: an auxiliary bracket supporting a portion of the support members which are not joined to the reinforcement members and joined to the support members and the reinforcement members.

In the rigidity-improved vehicle panel door, a flange portion which is formed to extend outward to be joined to the reinforcement members and a seating portion on which the reinforcement members are accommodated may be formed on the auxiliary bracket.

In the rigidity-improved vehicle panel door, any one of the external panel and the internal panel may be made of plastic material, and the other one thereof may be made of metal material.

In the rigidity-improved vehicle panel door, the external panel may be made of the plastic material, and the internal panel may be made of the metal material.

In the rigidity-improved vehicle panel door, the support members may be joined to the reinforcement members, and thus the rigid structure may include in a shape of a quadrangle.

In the rigidity-improved vehicle panel door, the rigid structure may be formed in a shape of a rectangle.

In the rigidity-improved vehicle panel door with the above-described configuration according to an exemplary embodiment of the present disclosure, the panel for the door may be manufactured from the plastic panel which is manufactured using an injection mold. Thus, various types of doors may be manufactured with less development costs for less time.

Furthermore, the support members in the longitudinal direction and the support members in the height direction that are mounted inside the panel for the door may be coupled to each other to surround each other and thus in a superimposed manner. Because of this, a portion of the support members in the longitudinal direction and a portion of the support members in the height direction that are joined to each other may have higher rigidity. Accordingly, the rigidity of the rigid structure may be increased, improving the rigidity of the entire door.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 6 is a perspective view exemplarily illustrating a state where a front end portion of a stabilizer is coupled to a front end portion of the internal panel in the rigidity-improved vehicle panel door according to the various exemplary embodiments of the present disclosure.

Figure 1:
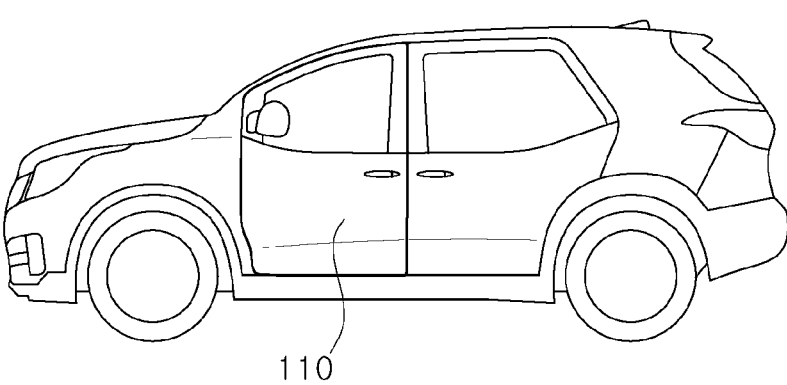
FIG. 1 is a side view exemplarily illustrating a lateral side of a vehicle.
Figure 2:
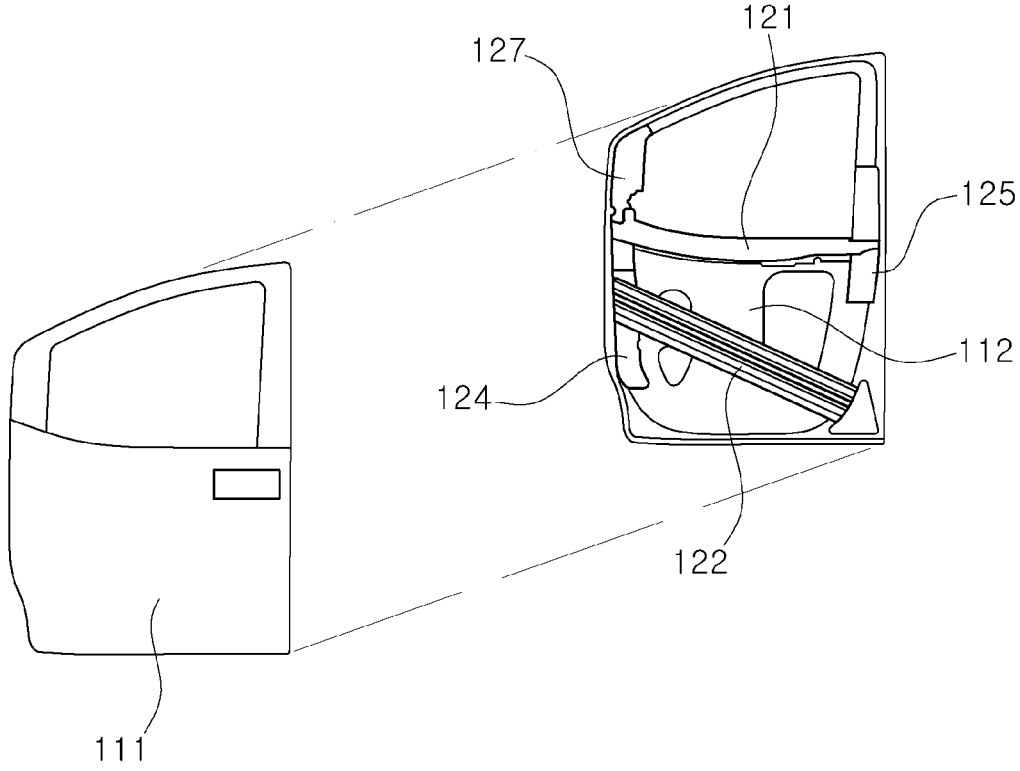
FIG. 2 is an exploded perspective view exemplarily illustrating a state where an external panel and an internal panel are assembled in the related art.
Figure 3:
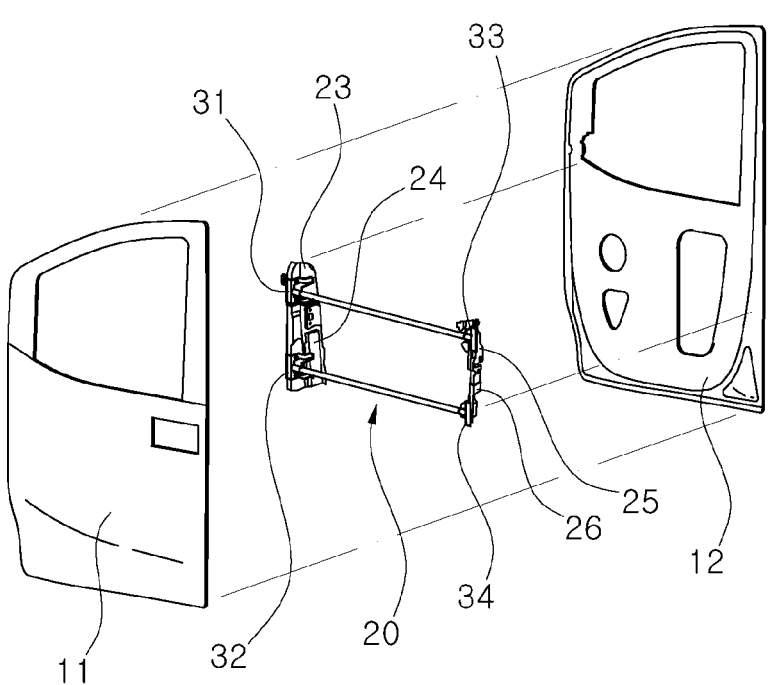
FIG. 3 is an exploded perspective view exemplarily illustrating a state where an external panel, a rigid structure, and an internal panel are assembled into a rigidity-improved vehicle panel door according to an exemplary embodiment of the present disclosure.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

A rigidity-improved vehicle panel door according to an exemplary embodiment of the present disclosure will be described in detail below with reference to the accompanying drawing.

A rigidity-improved vehicle panel door according to an exemplary embodiment of the present disclosure includes: an external panel 11 positioned, toward the outside of a vehicle, in a door of the vehicle; an internal panel 12, an external edge portion of the internal panel 12 being joined to the external panel 11 and the internal panel 12 being positioned, toward the interior of the vehicle, in the door 10 of the vehicle; support members 21 and 22 disposed in a longitudinal direction of the vehicle; reinforcement members 23 and 24 coupled to a front end portion of the door 10; reinforcement members 25 and 26 coupled to a rear end portion of the door 10; joint members 31 and 32 coupled to the reinforcement members 23 and 24, respectively, in superposed manner and coupled to the support members 21 and 22 to surround external surfaces of the support members 21 and 22; and joint members 33 and 34 coupled to the reinforcement members 25 and 26, respectively, in superposed manner and coupled to the support members 21 and 22 to surround the external surfaces of the support members 21 and 22.

The door 10 of the vehicle may include the external panel 11 which is positioned toward the outside of the vehicle and the internal panel 12 of which external edge portion is joined to the external panel 11 and which is positioned, toward the interior of the vehicle, in the door 10. A rigid structure 20 for reinforcing the rigidity of the door 10 is provided between the external panel 11 and the internal panel 12.

The external panel 11 and the internal panel 12 may be formed into predetermined shapes, respectively, and when joined to each other, may form the door 10.

One of the external panels 11 and the internal panel 12 is made of plastic material and the other one is made of metal material. For example, the external panel 11 is made of plastic material and the internal panel 12 is made of metal material.

Because any one of the external panels 11 and the internal panel 12 is made of plastic material, when a shape of the door 10 needs to be changed such as in vehicles that are suitable for small-quantity batch production, the shape of the door 10 may be advantageously changed by an injection molding with less time and costs. However, the use of the plastic panel may decrease the rigidity of the door 10 and the plastic panel of the door 10 may be deformed and separated. The rigid structure 20 is provided to prevent these problems.

Figure 4:
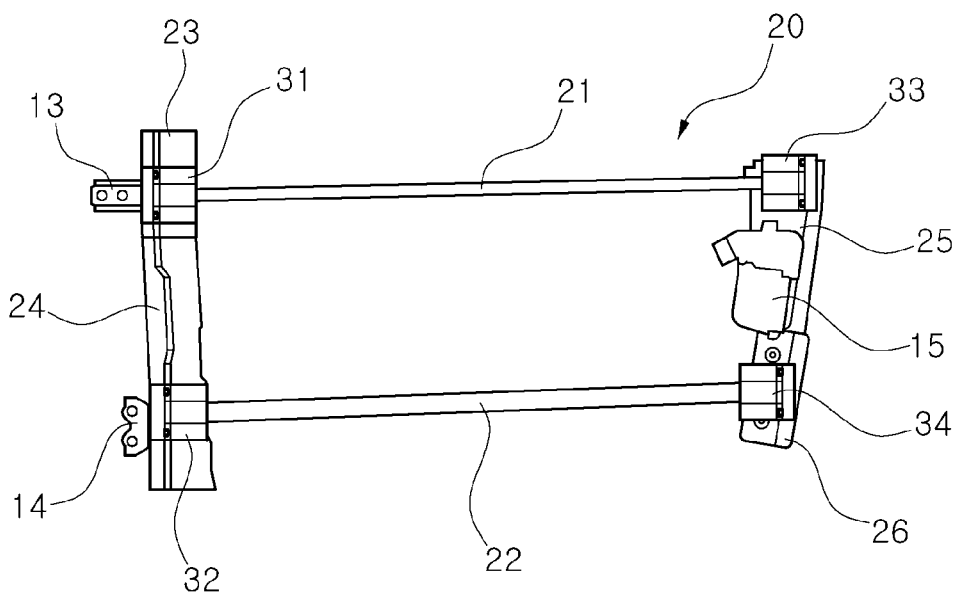
FIG. 4 is a schematic front view exemplarily illustrating the rigid structure which is used for the rigidity-improved vehicle panel door according to an exemplary embodiment of the present disclosure.
Figure 5:
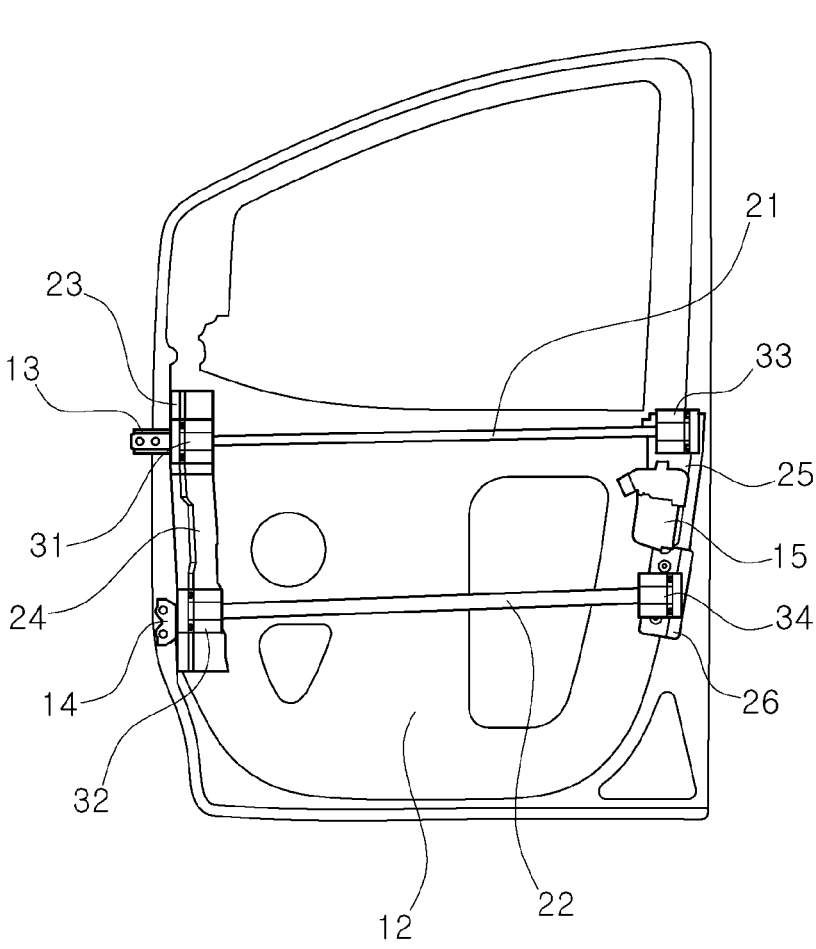
FIG. 5 is a perspective view exemplarily illustrating a state where the rigid structure is coupled to the internal panel according to various exemplary embodiments of the present disclosure.

The rigid structure 20 may include the support members 21 and 22, disposed in a longitudinal direction of the vehicle to be spaced from each other, the reinforcement members 23 and 24 provided on the front end portion of the door 10, and the reinforcement members 25 and 26 provided on the rear end portion of the door 10. The support members 21 and 22 may be joined to the reinforcement members 23, 24, 25, and 26 to form in a shape of a quadrangle, such as the shape of a rectangle as shown in FIG. 4. The rigid structure 20 with the present configuration may be coupled to the internal panel 12, and the external panel 11 may be then coupled to the internal panel 12. Thus, the door 10 may have sufficient rigidity and thus, when mounted on the vehicle, is prevented from being deformed.

The support members 21 and 22 may be implemented as a stabilizer 21 and an impact beam 22, respectively, according to an exemplary embodiment of the present disclosure, that are disposed in a height direction of the vehicle on the door 10 to be spaced from each other. The stabilizer 21 may be disposed at a belt line of the door 10 and the impact beam 22 may be disposed under the stabilizer 21 to reinforce the rigidity of the door 10. A portion other than end portions of each of the stabilizer 21 and the impact beam 22 may include a closed circular or rectangular cross section.

The reinforcement members 23, 24, 25, and 26 may be implemented as a hinge upper reinforcer 23, a hinge reinforcer 24, a latch reinforcer 25, and a latch lower reinforcer 26, respectively.

An upper hinge 13 that connects the door 10 to a body of the vehicle may be fastened to the hinge upper reinforcer 23 through a mounting bolt 13a and a mounting nut 13b. A front end portion of the stabilizer 21 may be coupled to the hinge upper reinforcer 23. A lower hinge which is positioned on a lower portion of the hinge upper reinforcer 23 and that connects the door 10 to the body may be fastened to the hinge reinforcer 24 under the upper hinge 13. A front end portion of the impact beam 22 may be coupled to the hinge reinforcer 24. A latch 15 may be provided on the latch reinforcer 25 in the rear end portion of the door 10, and a rear end portion of the stabilizer 21 may be coupled to the latch reinforcer 25. A rear end portion of the impact beam 22 may be coupled, under the latch reinforcer 25, to the latch lower reinforcer 26. With the present structure, the rigid structure 20 may include in a shape of a quadrangle, for example, the shape of a rectangle. Thus, the rigidity between the external panel 11 and the internal panel 12 may be reinforced.

In the rigid structure 20, the joint members 31 and 32 may be joined to the reinforcement members 23 and 24 while surrounding the front end portions of the support members 21 and 22, that is, the stabilizer 21 and the impact beam 22. The joint members 33 and 34 may be joined to the reinforcement members 25 and 26 while surrounding the rear end portions of the stabilizer 21 and the impact beam 22. Thus, the rigidity of the rigid structure 20 may be further improved.

The reinforcement member 23, 24, 25, and 26 may be implemented as the hinge upper reinforcer 23 to which the upper hinge 13 connecting the door 10 to the body of the vehicle is fastened and to which the front end portion of the stabilizer 21 is coupled. The joint member 31, 32, 33, and 34 may be implemented as an upper hinge joint 31 surrounding the front end portion of the stabilizer 21.

Furthermore, the reinforcement member 23, 24, 25, and 26 may be implemented as the hinge reinforcer 24 which is positioned at the lower portion of the hinge upper reinforcer 23, to which the lower hinge that hinge-connects the door 10 to the body of the vehicle is fastened under the upper hinge 13, and to which the front end portion of the impact beam 22 is coupled. The joint member 31, 32, 33, and 34 may be implemented as a lower hinge joint 32 surrounding the front end portion of the impact beam 22.

Furthermore, the reinforcement member 23, 24, 25, and 26 may be implemented as the latch reinforcer 25 on which the latch 15 is provided in the rear end portion of the door 10 and to which the rear end portion of the stabilizer 21 is coupled. The joint member 31, 32, 33, and 34 may be implemented as a latch upper joint 33 surrounding the rear end portion of the stabilizer 21.

The reinforcement member 23, 24, 25, and 26 may be implemented as the latch lower reinforcer 26 to which the rear end portion of the impact beam 22 is coupled under the latch reinforcer 25. The joint member 31, 32, 33, and 34 may be implemented as a latch lower joint 34 surrounding the rear end portion of the impact beam 22.

An example where the reinforcement member 23, 24, 25, and 26 is implemented as the hinge upper reinforcer 23 and where the joint member 31, 32, 33, and 34 is implemented as the upper hinge joint 31 will be described below. Alternatively, the same description may apply to a case where the joint member 31, 32, 33, and 34 is implemented as the lower hinge joint 32, the latch upper joint 33, or the latch lower joint 34.

The upper hinge joint 31 may include a flange portion 31*a* which is joined to the hinge upper reinforcer 23, and an accommodation portion 31*b* inside which an end portion of the support member 21 and 22 is accommodated.

Figure 6:
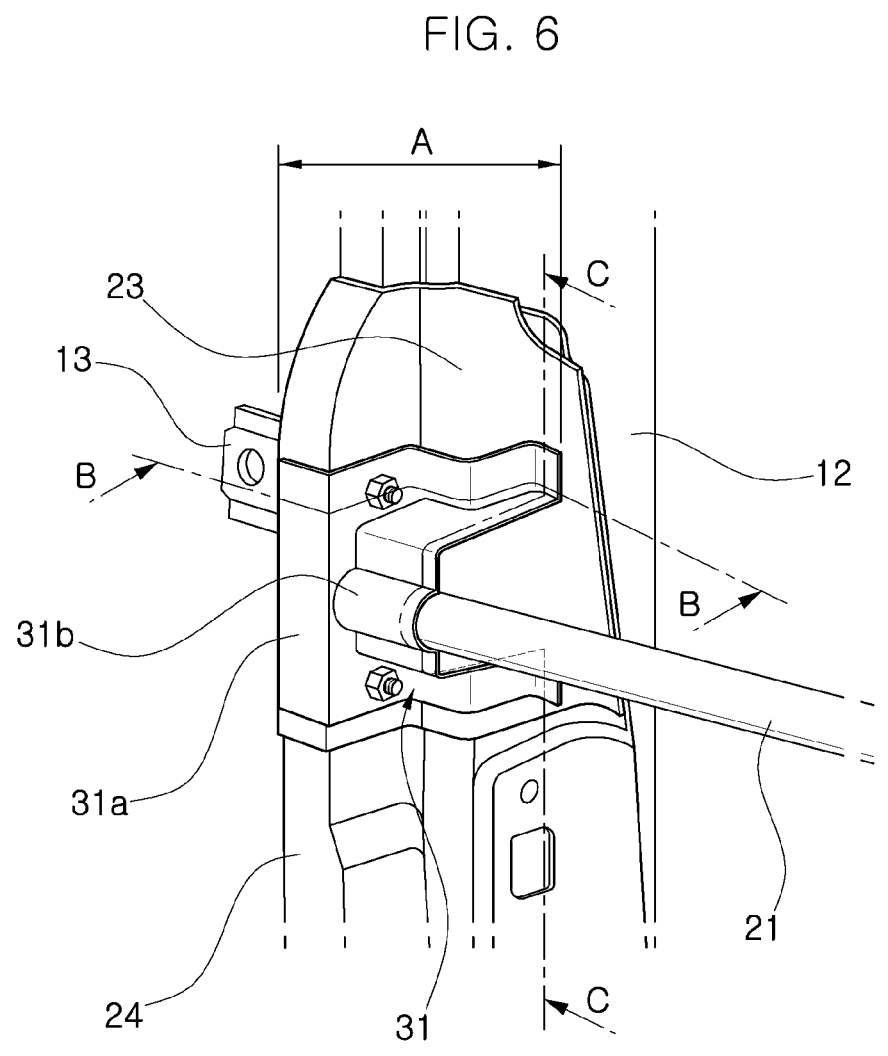

The upper hinge joint 31 may be joined to only a portion of the hinge upper reinforcer 23 that corresponds to a predetermined section (a section indicated by "A" in FIG. 6).

An external edge portion of the upper hinge joint 31 may be joined to the hinge upper reinforcer 23. Accordingly, the upper hinge joint 31 may include a closed cross section (refer to E in FIG. 7). This may be also applied for the joint member 32, 33, and 34. An external edge portion of the joint member 31, 32, 33, and 34 may be joined to the reinforcement member 23, 24, 25, and 26.

Figure 7:
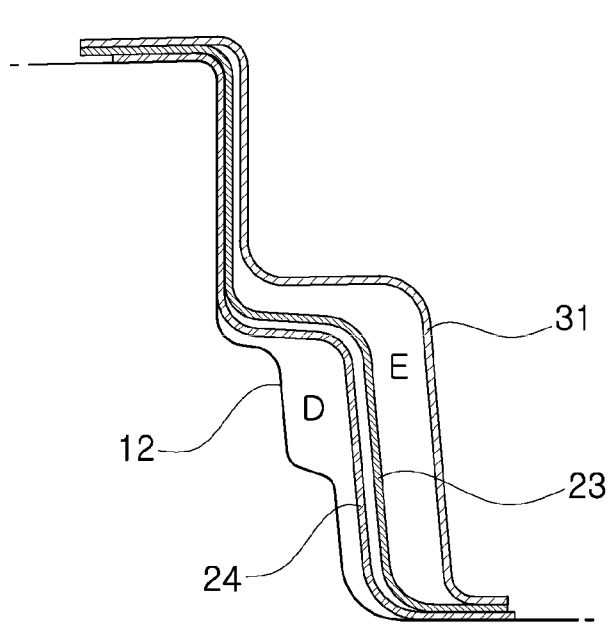
FIG. 7 is a cross-sectional view taken along line B-B on FIG. 6.

Moreover, an external edge portion of the internal panel 12 may be also joined to the hinge upper reinforcer 23 to which the upper hinge joint 31 is joined, and thus the hinge upper reinforcer 23 may include a closed cross section (refer to D in FIG. 7). This may be also applied for the reinforcement member 24, 25, and 26. An external edge portion of the reinforcement member 23, 24, 25, and 26 may be joined to the internal panel 12. Furthermore, the external edge portion of the reinforcement member 23, 24, 25, and 26 may be joined to the external panel 11.

The front end portion of the stabilizer 21 may be accommodated by a predetermined depth into the accommodation portion 31*b*.

The front end portion of the stabilizer 21 may be brought into surface-contact with an internal surface of the accommodation portion 31*b* inside the accommodation portion 31*b*, and the front end portion thereof and the internal surface may be joined to each other.

Figure 8:
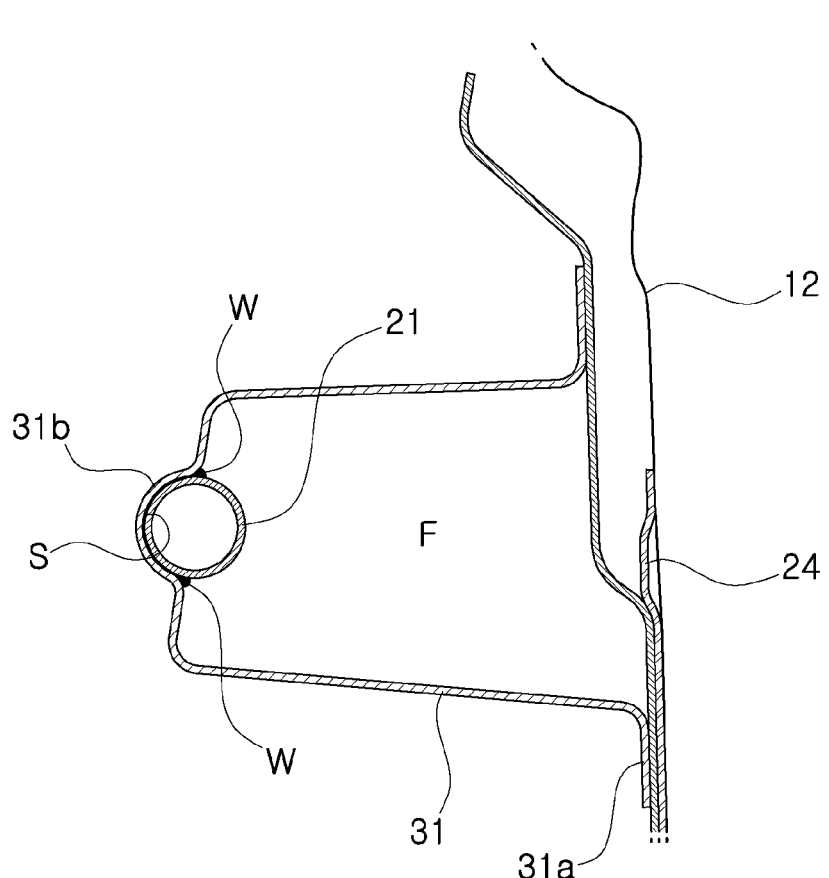
FIG. 8 is a cross-sectional view take along line C-C on FIG. 6.

The stabilizer 21 may be joined to the accommodation portion 31*b* using an adhesive S or by $CO_2$ welding (W) as shown in FIG. 8 (refer to space F in FIG. 8).

An auxiliary bracket 35 may be provided to support a portion of the front end portion of the stabilizer 21 which is not joined to the accommodation portion 31*b*.

The auxiliary bracket 35 may be provided in such a manner to support a surface of the front end portion of the stabilizer 21 that faces toward the interior of the vehicle.

A flange portion 35*a* and a seating portion 35*b* may be formed on the auxiliary bracket 35. The flange portion 35*a* may be formed to extend outward to be joined to the reinforcement member, 23, 24, 25, and 26, that is, to the hinge upper reinforcer 23. Each distal end portion of the stabilizer 21 and the impact beam 22 may be accommodated on the seating portion 35*b*.

The flange portion 35*a* may be joined to the hinge upper reinforcer 23, and thus the auxiliary bracket 35 may be integrally combined with the hinge upper reinforcer 23.

The seating portion 35*b* may be joined to the other portion of the front end portion of the stabilizer 21 which is not joined to the upper hinge joint 31, using the adhesive S or by $CO_2$ welding W, and thus may support the entire front end portion of the stabilizer 21.

Figure 9:
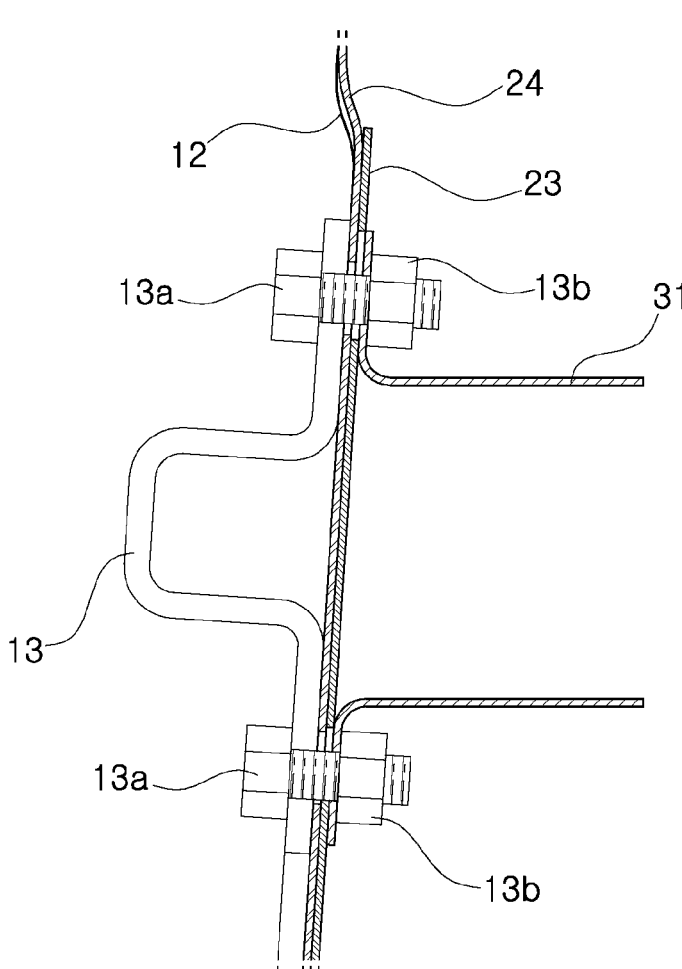
FIG. 9 is a cross-sectional view exemplarily illustrating a portion of an upper hinge joint to which an upper hinge is fastened in the rigidity-improved vehicle panel door according to the various exemplary embodiments of the present disclosure.
Figure 10:
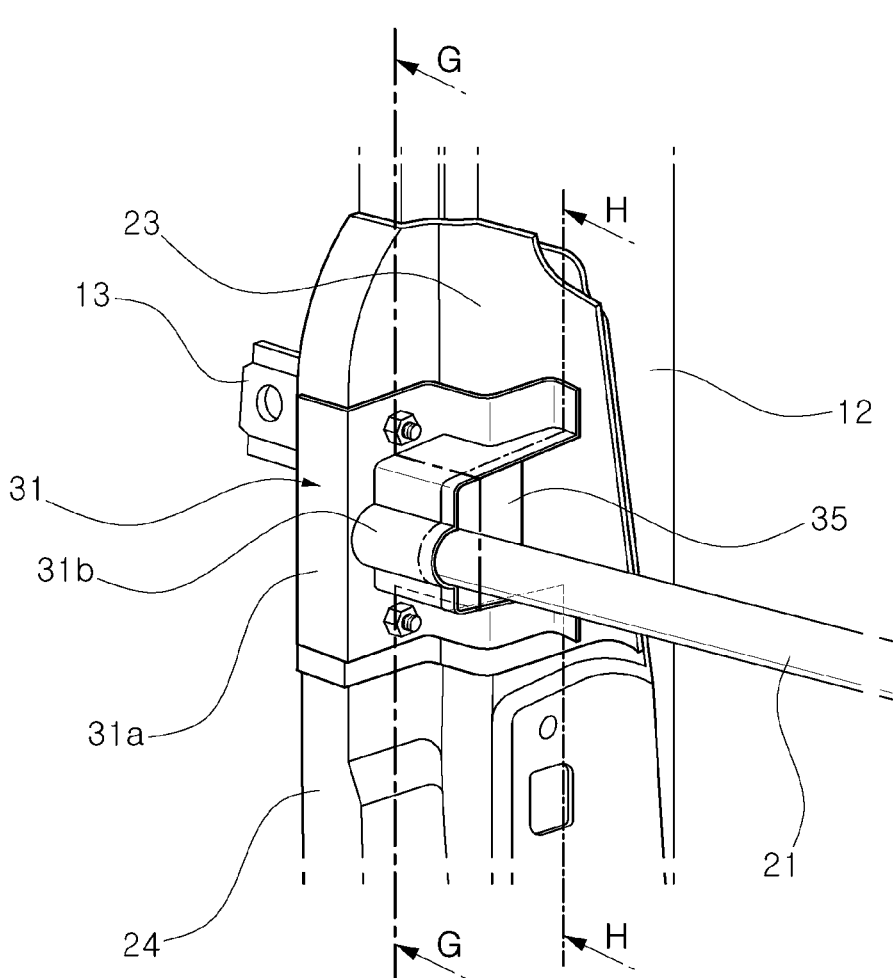
FIG. 10 is a perspective view exemplarily illustrating a state where the rigid structure is coupled to the internal panel in a rigidity-improved vehicle panel door according to various exemplary embodiments of the present disclosure.
Figure 11:
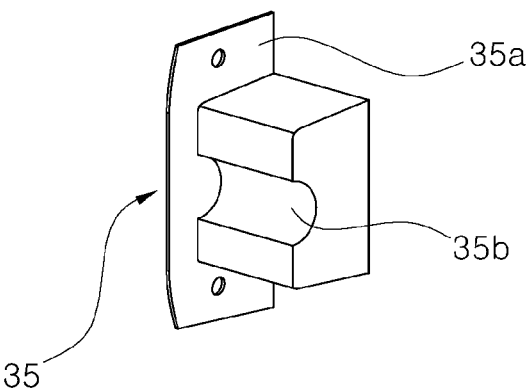
FIG. 11 is a perspective view exemplarily illustrating an auxiliary bracket which is used in the rigidity-improved vehicle panel door according to the various exemplary embodiments of the present disclosure.
Figure 12:
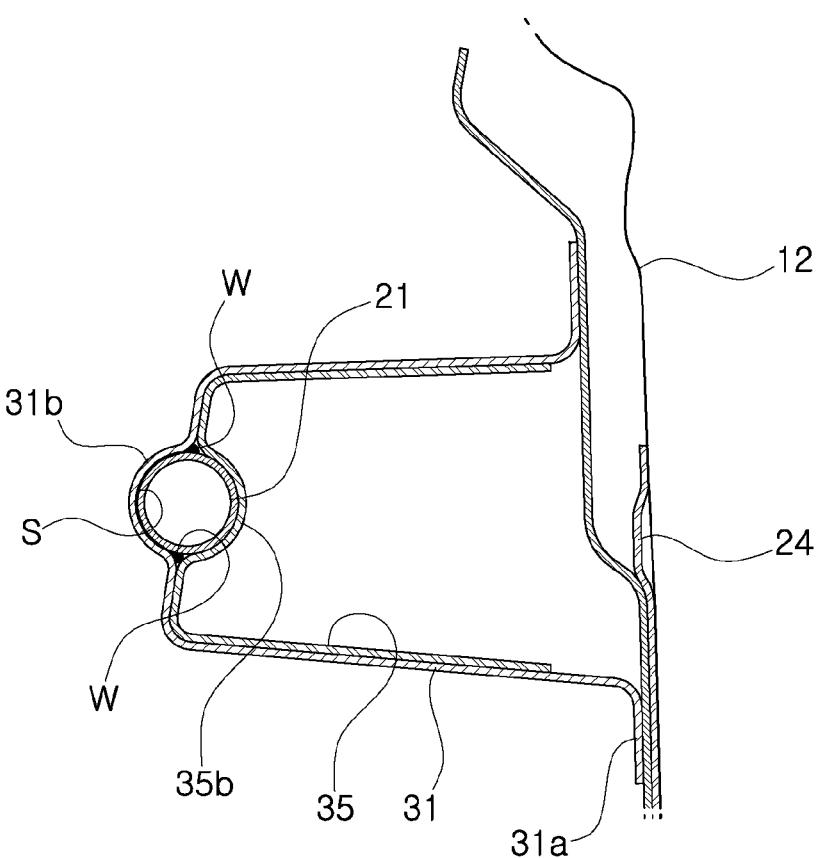
FIG. 12 is a cross-sectional view taken along line G-G on FIG. 10.
Figure 13:
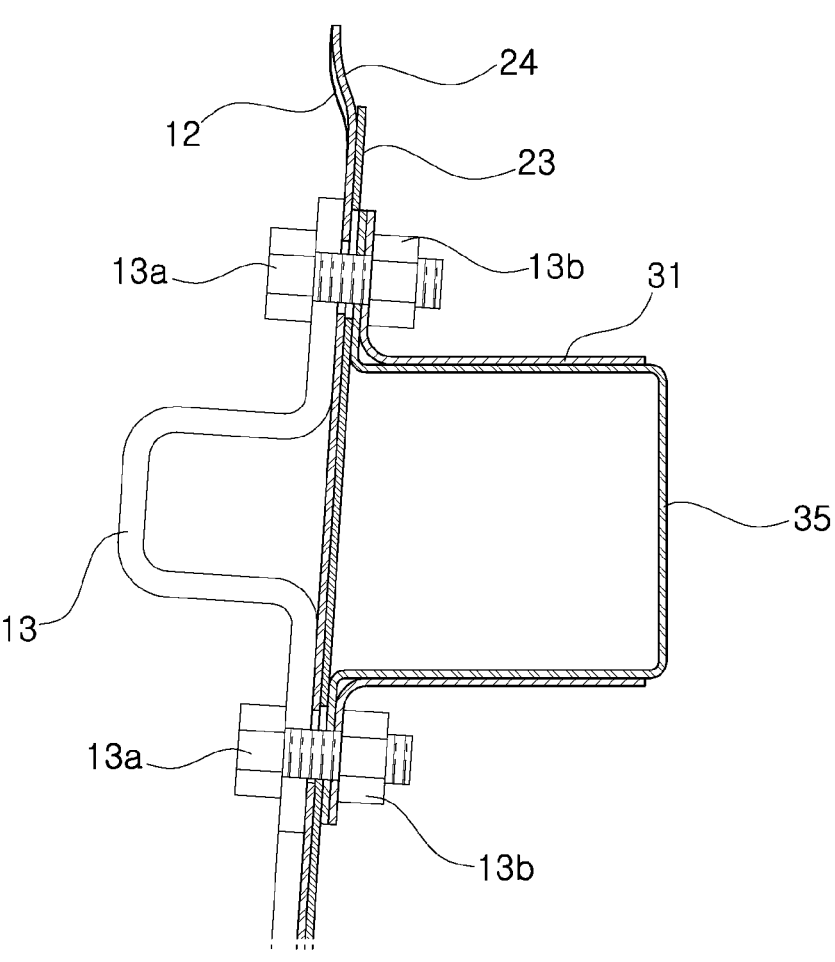
FIG. 13 is a cross-sectional view taken along line H-H on FIG. 10.

By use of the auxiliary bracket 35, a portion of the upper hinge joint 31 to which the upper hinge 13 is connected and open to the right side as shown in FIG. 9 may include a closed cross section as shown in FIG. 13, and therefore the upper hinge 13 is supported more securely to enhance the rigidity of the door 10.

It is noted that the structure as described above may also be applied to a portion where the rear end portion of the stabilizer 21 is joined by the latch upper joint 33 in a surrounded manner, and a portion where the front end portion of the impact beam 22 is joined by the lower hinge joint 32 at a lower hinge 14 that connects the door 10 to a body of the vehicle, and a portion where the rear end portion of the impact beam 22 is joined by the latch lower joint 34, respectively.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular form may also include a plural form. The expression "at least one (or one or more) of A, B, and C" may include one or more of all combinations that may be made by combining A, B, and C.

In the exemplary embodiment of the present disclosure, it should be understood that a term such as "include" or "have" is intended to designate that the features, numbers, steps, operations, elements, parts, or combinations thereof described in the specification are present, and does not preclude the possibility of addition or presence of one or more other features, numbers, steps, operations, elements, parts, or combinations thereof.

A singular expression includes a plural expression unless the context clearly indicates otherwise.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A vehicle panel door comprising:
an external panel positioned in a door of the vehicle toward an outside of the vehicle;
an internal panel positioned in the door of the vehicle toward an interior of the vehicle, wherein an external edge portion of the internal panel is joined to the external panel;
a support member disposed in a longitudinal direction of the vehicle;
a reinforcement member coupled to a front end portion and a rear end portion of the door, respectively;

joint members superposed and coupled to the reinforcement member, respectively and coupled to the support member to surround an external surface of the support member; and an auxiliary bracket supporting a portion of the support member which is not joined to the reinforcement member, and joined to the support member and the reinforcement member, wherein the support member is supported by the joint member and the auxiliary bracket along a perimeter of the support member, wherein the support member is separated from the internal panel along the longitudinal direction of the vehicle.

2. The vehicle panel door of claim 1, wherein the joint members include a flange portion which is joined to the reinforcement member and an accommodation portion inside which an end portion of the support member is accommodated.

3. The vehicle panel door of claim 2, wherein the end portion of the support member is accommodated by a predetermined depth into the accommodation portion, and wherein the support member is brought into surface-contact with the accommodation portion inside the accommodation portion.

4. The vehicle panel door of claim 1, wherein the support member includes a stabilizer and an impact beam that are disposed in a height direction of the vehicle on the door to be spaced apart from each other.

5. The vehicle panel door of claim 4, wherein the reinforcement member includes a hinge upper reinforcer to which an upper hinge connecting the door to a body of the vehicle is fastened and to which a front end portion of the stabilizer is coupled, and wherein the joint members include an upper hinge joint surrounding the front end portion of the stabilizer.

6. The vehicle panel door of claim 5, wherein the reinforcement member further includes a hinge reinforcer which is positioned on a lower portion of the hinge upper reinforcer, to which a lower hinge that hinge-connects the door to the body of the vehicle is fastened under the upper hinge, and to which a front end portion of the impact beam is coupled, and wherein the joint members further include a lower hinge joint surrounding the front end portion of the impact beam.

7. The vehicle panel door of claim 4, wherein the reinforcement member further includes a latch reinforcer on which a latch is provided in a rear end portion of the door and to which a rear end portion of the stabilizer is coupled, and wherein the joint members further include a latch upper joint surrounding the rear end portion of the stabilizer.

8. The vehicle panel door of claim 7, wherein the reinforcement member further includes a latch lower reinforcer to which a rear end portion of the impact beam is coupled under the latch reinforcer, and wherein the joint members further include a latch lower joint surrounding the rear end portion of the impact beam.

9. The vehicle panel door of claim 1, wherein an external edge portion of the joint members is joined to the reinforcement member.

10. The vehicle panel door of claim 1, wherein an external edge portion of the reinforcement member is joined to the internal panel or the external panel.

11. The vehicle panel door of claim 1, wherein the joint members and the support member are joined to each other using an adhesive.

12. The vehicle panel door of claim 1, wherein the joint members and the support member are joined to each other by $CO_2$ welding.

13. The vehicle panel door of claim 1, wherein a flange portion which is formed to extend outward to be joined to the reinforcement member and a seating portion on which the reinforcement is accommodated are formed on the auxiliary bracket.

14. The vehicle panel door of claim 1, wherein one of the external panel and the internal panel is made of plastic material, and another thereof is made of metal material.

15. The vehicle panel door of claim 14, wherein the external panel is made of the plastic material, and the internal panel is made of the metal material.

16. The vehicle panel door of claim 1, wherein the support member is joined to the reinforcement member, and thus a structure formed of the support member and the reinforcement member is in a shape of a quadrangle.

17. The vehicle panel door of claim 16, wherein the structure is formed in a shape of a rectangle.

18. A vehicle including a rigidity improved the vehicle panel door of claim 1.

19. The vehicle of claim 18, wherein the support member includes a stabilizer and an impact beam that are disposed in a height direction of the vehicle on the door to be spaced from each other, and where a rear end portion of the stabilizer is joined by a latch upper joint by surrounding thereof, and a front end portion of the impact beam is joined by a lower hinge joint at a lower hinge that connects the door to a body of the vehicle, and a rear end portion of the impact beam is joined by a latch lower joint, respectively.

*  *  *  *  *